United States Patent [19]
Watson

[11] Patent Number: 5,901,749
[45] Date of Patent: May 11, 1999

[54] THREE-WAY POPPET VALVE

[75] Inventor: Richard R. Watson, Missouri City, Tex.

[73] Assignee: Gilmore Valve Company, Inc., Houston, Tex.

[21] Appl. No.: 08/820,769

[22] Filed: Mar. 19, 1997

[51] Int. Cl.$^6$ .................. F15B 13/042; F16K 11/048
[52] U.S. Cl. .................. 137/625.66; 137/625.27; 251/357; 251/900
[58] Field of Search .................. 137/329.04, 625.27, 137/625.66; 251/357, 900

[56] References Cited

U.S. PATENT DOCUMENTS

| 2,934,090 | 4/1960 | Kenann et al. | 137/625.27 X |
| 3,612,479 | 10/1971 | Smith | 251/900 X |
| 3,805,837 | 4/1974 | Stampfli | 137/625.6 |
| 3,921,660 | 11/1975 | Kowalski | 251/900 X |
| 4,887,643 | 12/1989 | Tomlin et al. | 137/625.66 |
| 5,409,040 | 4/1995 | Tomlin | 137/625.66 |

Primary Examiner—Gerald A. Michalsky
Attorney, Agent, or Firm—Bush, Riddle & Jackson

[57] ABSTRACT

A high pressure poppet valve having a valve body defining inlet, outlet and vent passages, and with a valve cage in sealed relation within the valve body which defines an internal seat projection having spaced circular seat shoulders. A seal carrier, which may be a pilot pressure responsive piston, supports spaced seal glands each having a seal assembly composed of an elastomeric seal ring which is captured within a gland seal recess by a relatively hard, extrusion resistant seal ring defining a circular sealing corner. A spacer spool is interposed between the seal assemblies and maintains the seal assemblies within the respective gland seal recesses. The spacer spool defines support flanges at each end which cooperate with gland structure to secure the seal assemblies in a manner exposing only the circular seal corners of the extrusion resistant sealing elements for sealing engagement with the spaced circular seat shoulders of the internal seat projection and for securing the circular sealing corners against pressure induced extrusion. The seal carrier element is guided and stabilized during its linear movement within the valve cage.

17 Claims, 4 Drawing Sheets

THREE-WAY POPPET VALVE

BACKGROUND OF THE INVENTION

1. Field of the Invention

This invention relates generally to pilot pressure operated poppet valves and more specifically concerns a three-way, high pressure, pilot pressure operated poppet valve having a guided and stabilized pressure responsive valve piston which supports spaced polymer/elastomer seal assemblies that are designed for high pilot pressure operation in the range of 5,000 psi or greater and high working pressure in the range of 10,000 psi or greater and with seal structure and valve components interrelated to ensure minimum pressure induced extrusion of the seal material and long service life at these high pressure ranges.

2. Description of the Prior Art

While pilot operated poppet valves have been employed for many years, problems have been encountered with poppet valves that operate under high pressure conditions. Particularly, seal damage or detriation occurs by pressure induced extrusion of seal material into gaps between mechanical surfaces. When so extruded, the sealing material can be subject to a condition known as "nibbling" wherein the sealing material is pinched between metal surfaces to the extent that minute sections of the sealing material are cut and broken away. When this condition occurs, especially when it occurs repetitiously, the sealing capablity of the seal can become degraded to the point that valve leakage occurs. It is necessary in this case, to either replace the valve or to replace the damaged sealing elements of the valve to thus restore it to operational condition. The problem of seal nibbling is accenuated under circumstances where the gland of the valve or the valve seat are subject to potential lateral movement such as due to pressure induced vibration or misalignment of valve components during opening and closing movement. For example, if sealing material is pressure extruded into a gap between mechanical valve components and one of the valve components is move laterally, such as by vibration or other pressure induced force, the extruded section of the sealing material can be severly pinched, so that it is either cut away or deformed beyond its elastic limits so that it becomes degraded. Further, high velocity flow of high pressure fluid through a gap of minimal dimension between a valve seat and valve seal can subject the exposed sealing material to high pressure erosion which also degrades the sealing material to the point that its sealing capability can be lost. It is desirable, therefore, to provide a poppet valve mechanism having one or more high pressure seal assemblies, each of which is protected against pressure induced extrusion, nibbling or pressure induced deteriation.

Efforts have been made in the past to design poppet type valves that are responsive to relatively high pressure conditions. U.S. Pat. No. 3,131,722 of Abbott, et al shows a three-way valve that is designed for quick shifting characteristics. The various the seal elements of this valve are in the form of simple O-rings that are located in unsupported relation within seal grooves. A spacer element 22 is employed between the spaced seal glands. The unsupported elastomer seals of Abbott, et al will deteriorate quite readily under the high pressure conditions for which the valve of the present invention is designed. For example, U.S. Pat. No. 3,736,960 of Cohen discloses a snap-acting, fluid amplifing valve including a piston and piston stem arrangement. The spring urged piston has a lower piston element 45 having flat upper and lower elastomer seals for sealing engagement with tapered vent and supply nozzles. These elastomer seals will become damaged quite readily by the influence of high pressure fluid service.

U.S. Pat. No. 3,805,837 of Stampfli discloses a control valve arrangement having a piston that incorporates flap valves 3 and 4 which are spaced by a core 2 in the form of a spool-like member. Only the radially inner portions of the seals of the opposed glands are supported by the spool member 2. Thus, the relatively unsupported elastomer sealing elements will function properly only under average operational pressure conditions. When high working pressures in the range of 10,000 psi are encountered, these unsupported seals will fail quite readily; in fact, they will be readily extruded from their grooves and will be subject to nibbling and other damage. U.S. Pat. No. 3,977,438 of Muchow, et al discloses a pilot valve arrangement having a reset mechanism and having a spool member 35 with a valve head 36 at its lower end and having upper and lower seals that are captured in circular recesses by respective retainer rings or washers. These resilient seals, which may be O-ring type seals, are positioned for engagment with sharp circular seat corners such as shown at 38. These seals, under even nominally high pressure conditions, will be subject to pressure induced erosion, nibbling or other deterioration. The present invention is designed to overcome the disadvantages of the valve seal arrangements that are disclosed in the above identified U.S. Patents and to provide for efficient sealing under extremely high pressure conditions while protecting against pressure induced extrusion, seal nibbling, fluid erosion and other factors that might otherwise result in seal deterioration and resulting valve failure.

SUMMARY OF THE INVENTION

It is a principal feature of the present invention to provide a novel poppet valve mechanism having seal assemblies that are essentially captured within seal recesses defined by interrelated mechanical components such that only minute circular portions of the seal assemblies is exposed to high working pressure, consequently, protecting the seal assembly against pressure induced extrusion and erosion which might otherwise cause seal damage or deterioration.

It is another feature of the present invention to provide a novel poppet valve mechanism that is operational under extremely high pressure conditions, in the range of 10,000 psi working pressure, for example, and which is precisely guided during linear travel between open and closed positions to thus minimize the potential for seal nibbling or other seal deteriorating factors.

It is an even further feature of the present invention to provide a novel high pressure poppet valve mechanism incorporating seal assemblies having resilient O-rings that are captured by extrusion resistant seal rings composed of polymer or any other extrusion resistant sealing material so that seal assembly is mechanically yieldable and yet is protected against extrusion under high pressure conditions.

It is another feature of the present invention to provide a novel high pressure poppet valve mechanism having seal assemblies, with extrusion resistant pressure exposed sealing regions which are mechanically supported so as to minimize the potential for pressure induced extrusion or erosion especially during initial valve opening and final valve closing under conditions of high working pressure.

It is feature of the this invention to provide a novel high pressure poppet valve mechanism which is operated by pilot pressure and is enabled to accommodate high pilot pressure in the range of 5,000 psi or greater.

Briefly, the various objects and features of the present invention are realized through the provision of a poppet valve mechanism which may be pilot operated and which is defined by a valve body having a valve cage disposed in sealed relation therein. The valve body defines supply, cylinder or outlet passages and also defines a vent passage and, in the event of pilot operation, defines a pilot pressure passage. All of these passages are in communication with a valve chamber that is defined within the valve body. In the preferred embodiment of the invention, a spring urged, pilot pressure operated piston is disposed for linear movement within the valve cage and has a piston stem supporting at least one and preferably a pair of spaced valve glands, each having a seal assembly therein. A spool spacer is disposed between the valve glands and defines support flanges at the axial ends thereof which function to secure the seal assemblies within respective circular seal recesses of the valve glands. Each of the seal assemblies is defined by a circular elastomeric O-ring seal, composed of Buna-N, Viton or any other suitable elastomer material, which is captured within a circular seal recess by a circular, extrusion resistant seal ring, which may be composed of a suitable polymer such as Delrin, Teflon, etc. The seal glands and the spacer spool member provide structural support for the seal assembly and expose only a small circular sealing corner of the extrusion resistant seal material to the pressure of the working fluid. Further, the upper and lower seal assemblies and the metal support structure therefore are configured for structural interrelation with spaced circular seat corners defined at the axial ends of an internal seat projection of the cage member to support the seal assembly in a manner minimizing the potential for pressure induced extrusion of any portion of the seal assembly. This structural interrelation enables the seal assembly to function adequately under extremely high pressure conditions without becoming extruded, or eroded by fluid flow under high pressure conditions.

The valve operating piston is provided with an elongate, generally cylindrical stem section about which the seal glands, seal assemblies and seal spacer spool are positioned. To minimize the potential for lateral movement of the lower end of the piston stem and thus the gland members during linear travel thereof, the lower seal gland is in the form of a gland nut that is threaded to the lower end of the piston stem. The gland nut is in the form of a castigated nut which is secured against inadvertent rotation relative to the piston stem by a cotter key extending through a lateral bore in the lower end of the piston stem. To ensure piston stem stabilization during its linear travel, the gland nut is provided with an enlarged guide flange that is disposed for guiding relation within a cylindrical internal guide surface that is defined by the lower end of the valve cage member. Thus, as the seal assembly is moved linearly by the pilot operated piston member, its lower end is guided so that its potential for lateral excursion is minimized and thus the potential for seal nibbling is also minimized.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
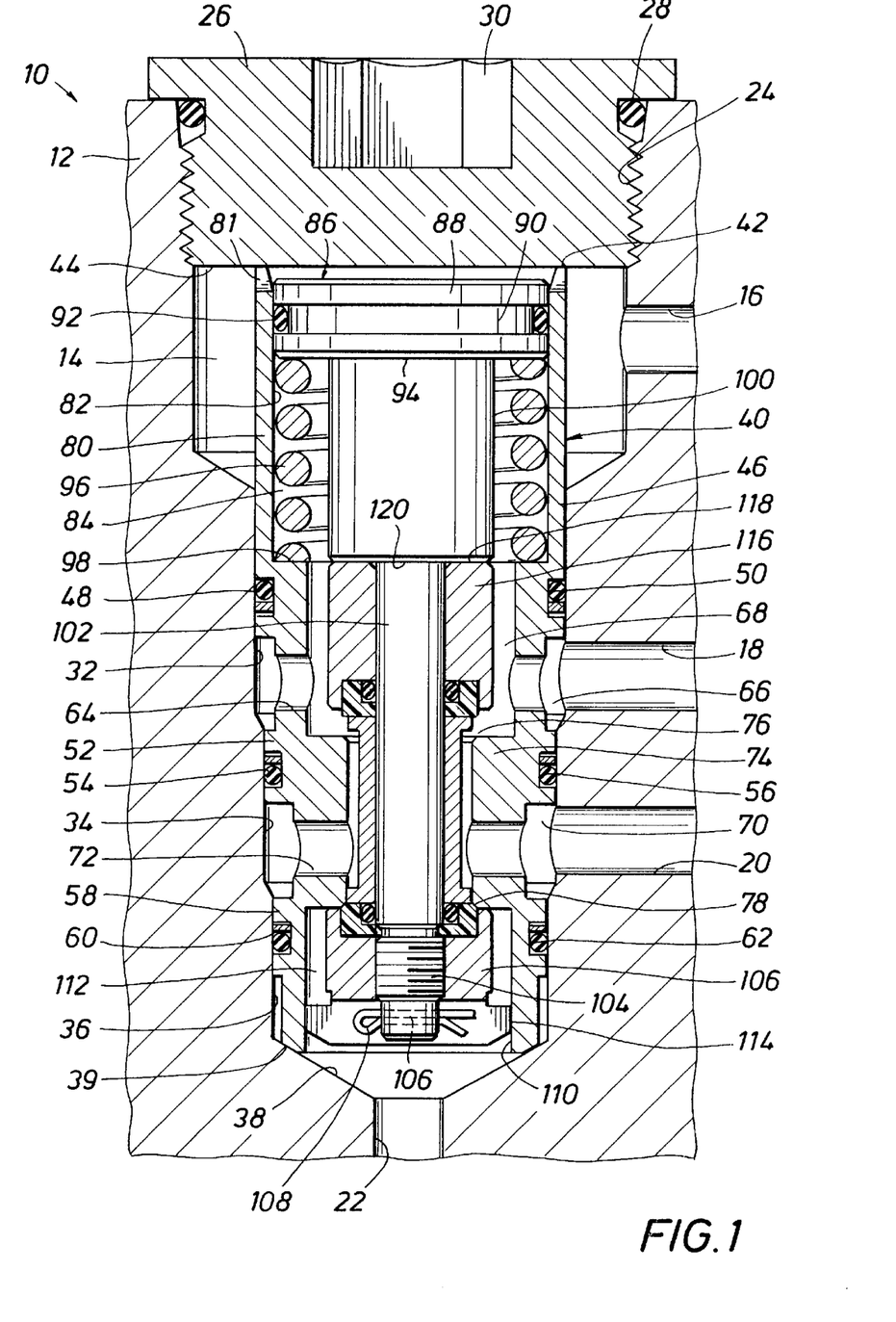
FIG. 1 is a sectional view of the preferred embodiment of the present invention showing a portion of body of the poppet valve of the present invention and further showing the internal valve components thereof in the closed position for preventing communication of the supply pressure with the supply pressure outlet.
Figure 2:
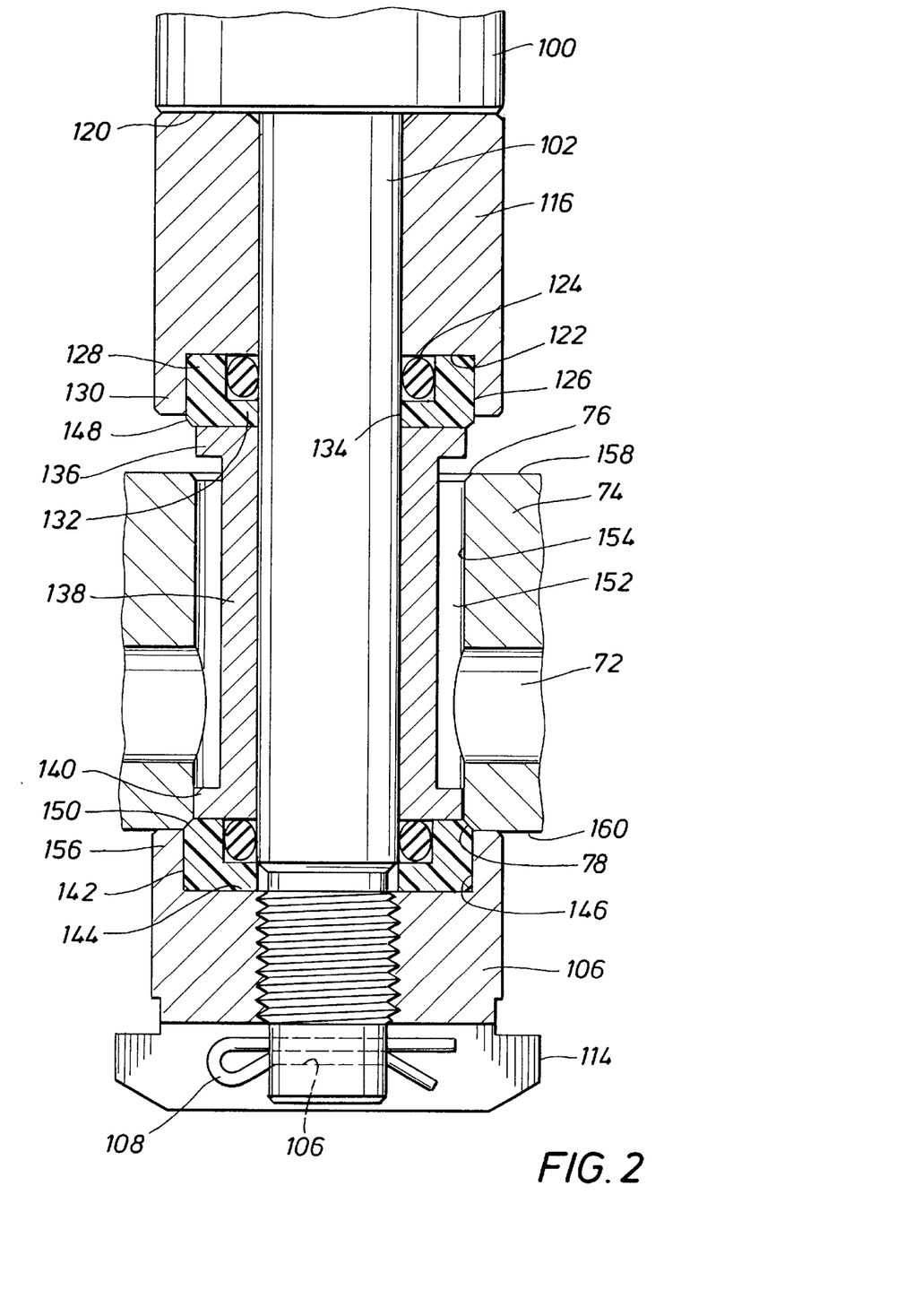
FIG. 2 is an enlarged fragmentary sectional view illustrating the piston supported spaced seal glands and seal assemblies of the high pressure poppet valve of FIG. 1, with the valve mechanism in the closed position thereof.

Referring now to the drawings and first to FIGS. 1 and 2, a preferred embodiment of the present invention is shown generally at 10, having a valve body 12 defining an internal valve chamber 14 and further defining a pilot passage 16, a vent passage 18, a cylinder or valve outlet passage 20 and a supply passage 22 which are each in communication with the valve chamber. At its upper end, the valve body defines an internally threaded access opening 24 which is adapted to receive an externally threaded closure plug 26 which is sealed with respect to the valve body by a circular sealing element 28. The closure plug defines a hex receptacle 30 which is adapted to receive a hex wrench to enable the closure plug to be threaded into or removed from the access opening 24 by rotational force that is manually applied the hex wrench. The internal wall surface of the valve chamber 14 defines internal sealing surfaces of differing diameter, being an upper cylindrical sealing surface 32, an intermediate cylindrical sealing surface 34 and a lower internal sealing surface 36. Below the sealing surface 36, the valve body defines a tapered shoulder surface 38 which is intersected by the supply passage 22. The shoulder surface 28 defines the bottom of the valve chamber 14 and also functions as the lower stop for a valve cage member shown generally at 40. The upper end 42 of the valve cage is contacted by a lower planar surface 44 of the closure member 26 to thus maintain the lower end 39 of the cage 40 firmly seated against the tapered shoulder surface 38 within the valve chamber.

The valve cage functions as a piston receptacle and guide and defines an upper cage section 46 of a dimension for close fitting relation with the upper cylindrical sealing surface 32 and is sealed with respect to the surface 32 by a high pressure seal assembly comprising a resilient O-ring seal and a back-up ring that are received within a circular seal groove 50 defined externally of the upper cage section 46. The valve cage 40 also defines an intermediate cage section 52, being of smaller diameter as compared with the upper cage section 46 and being of a dimension for close fitting relation with the intermediate cylindrical sealing surface 34 of the valve chamber. A seal assembly 54 having an elastomer O-ring type sealing element and a back-up ring, being oppositely arranged as compared to the seal assembly 48, is retained within an external circular seal groove 56 that is defined within the intermediate cage section 52. The lower end of the cage member 40 is also sealed with respect to the lower portion of the valve chamber in the same manner. The valve cage defines a lower sealing section 58 having a diameter being smaller than the diameter of the intermediate cage section 52 and being of a dimension to be received in close fitting relation within the internal cylindrical sealing section 36 of the valve chamber. A seal assembly 60 having an elastomer seal ring and a back-up ring is disposed within a circular seal groove 62 of the lower cage section 58 and establishes high pressure sealing between the lower portion of the cage member and the internal cylindrical surface 36 of the valve chamber defined by the valve body.

Between the upper and intermediate sealing sections of the cage member 40, the cage is provided with a plurality of apertures 64 which communicate with an annular recess 66 or annulus being defined between the upper and intermediate cage sections and being in registry with the vent passage 18. The cage ports 64 also communicate the annular recess 66 or annulus with a piston and valve chamber 68 that is defined within the cage member 40. Likewise, between the intermediate and lower cage sections 52 and 58, the cage member defines an external circumferential recess or groove 70 which is located in registry with the cylinder or working fluid outlet passage 20 and further defines a plurality of fluid transfer ports 72 that communicate with the annular, circumferential recess 70 and thus also communicate the recess 70 with the cylindrical passage 20 of the internal valve chamber 68 of the cage member. The fluid transfer ports 72 are located within an annular valve seat section 74 which projects radially inwardly of the cage structure and defines circular seat corners or shoulders 76 and 78 that are defined by opposite axial ends of the internal seat projection and are located on opposite axial sides of the fluid transfer ports 72.

The upper end of the valve cage defines a piston and spring section 80 having an internal cylindrical surface 82 which defines a piston chamber 84 for receiving a piston member shown generally at 86. The piston member defines a piston head 88 having a circumferential seal groove 90 within which is received a circular O-ring type resilient sealing element 92 that establishes sealing between the piston head and the internal cylindrical surface 82 of the piston and seal section 80 of the valve cage. The piston head defines a lower piston shoulder 94 against which is seated the upper end of a valve closing compression spring 96 for the purpose continuously urging the piston 86 upwardly to the valve closing position. The lower end of the compression spring 96 is seated on an inwardly projecting annular shoulder 98 that is defined within the cage member 40.

The piston defines a piston stem having an upper stem section 100 of a large dimension for insuring proper positioning of the compression spring 96 within the annular space between the cylindrical wall of the piston and spring section and the piston stem. Below the upper piston stem section 100, the piston stem defines a small dimensioned section 102 having a lower externally threaded end 104 which is adapted to receive a lower gland member in the form of a castigated gland nut 106. The lower end of the piston stem section 102 also defines a transverse bore 106 into which is positioned a cotter key 108 which secures the castigated gland nut 106 against inadvertent rotation relative to the threaded section of the piston stem. For the purpose of piston stem stabilization and for guiding the piston during its linear travel, the lower section of the valve cage defines an internal cylindrical guide surface 110 defining an open ended cage pocket 112 within which the castigated gland nut 106 is linearly moveable. The gland nut 106 defines a guide flange 114 having an external circular peripheral guide surface 115 that is disposed in close fitting, guiding relation with the internal cylindrical guide surface 110. Consequently, as the piston stem is moved linearly, the guide flange 114 maintains its guiding relation with the internal surface 110 so that the lower end of the piston assembly is secured against lateral movement. This feature insures that the piston is always properly oriented during its opening and closing movement and ensures that the seal assemblies of the valve mechanism are stabilized against lateral excursion both while statically positioned and during opening and closing movement and is thus protected against damage by pressure induced extrusion and seal nibbling.

Immediately below the enlarged cylindrical section 100 of the piston stem, an annular seal gland member 116, positioned about the piston stem section 102, has its upper end 118 maintained in engagement with a circular shoulder 120 that is defined at the intersection of the piston stem sections 100 and 102. The annular seal gland 116 defines a circular seal recess 122 which opens downwardly as shown in FIG. 2 and receives a high pressure, extrusion resistant seal assembly having an elastomeric O-ring seal 124 with the inner periphery thereof disposed in sealing engagement with the cylindrical surface of the piston stem section 102 and being captured within a circular seal recess that is defined by a circular, cup-like extrusion resistant seal 126 having a circumferential seal restraint flange 128 which is received in close fitting relation within a circular wall section 130 of the annular gland member 116. The cup-like polymer seal, which may be composed of a suitable polymer material such as Delrin, Teflon or the like, also defines a lower support wall 132 having a central opening 134 through which the piston stem extends. The lower support wall of the polymer seal member 126 is in turn supported by the upper end and upper support flange 136 of a spacer spool element 138 having a central passage through which the piston stem section 102 extends. At its lower end the spacer spool element defines a lower support flange 140 which serves to maintain a lower seal assembly 142 within an annular seal pocket or recess 144 that is defined within the castigated gland nut 106. The seal assembly 142 also comprises an elastomeric O-ring sealing element which is positioned with its inner periphery in sealing engagement with the piston stem section 102 above the lower threaded section of the seal and having its upper circular portion in supported engagement with the lower end of the spacer spool element. The elastomeric O-ring seal is positioned within a circular seal recess that is defined by an extrusion resistant, i.e., polymer seal member 146 which is of the same configuration and orientation as the polymer seal member 126. With the spacer spool element in supporting engagement with the upper and lower seal assemblies as shown in FIGS. 1 and 2, a small annular sealing corner of each of the polymer seal elements, 148 and 150 respectively, is exposed for sealing engagement with respective seat corners 76 and 78 of the internal annular seat projection of the valve cage member. The elastomer sealing element 124 may be composed of any suitable elastomer for the intended service. For example, it may be composed of elastomer materials such as Buna-N, Viton or other hydrocarbon resistant elastomers when the working fluid is in the form of a hydrocarbon. The polymer sealing element may be composed of Delrin, Teflon or any other suitable polymer material for the intended service. It should also be born in mind that, within the spirit and scope of the present invention, each of the sealing components may be composed of different materials depending upon the sealing characteristics that are to be encountered. For high pressure sealing however, the material forming the exposed sealing corner of the seal assembly should be resistant to pressure induced extrusion, so that it will necessarily be composed of a rather hard sealing material such as a polymer, a hard elastomer, a combination of polymer and elastomer material or in some cases a suitable metal.

The support flanges 136 and 140 of the spacer spool element are of a dimension to be received within a seat opening 152 and in close fitting relation with a cylindrical internal surface 154 that defines the seat opening. As shown in FIG. 2, the lower support flange is shown to be positioned within the seat opening and is in sufficiently closely spaced relation with the cylindrical surface 154 as to minimize the potential for pressure induced extrusion of the polymer sealing material between the outer periphery of the lower support flange and the cylindrical surface 154. Further, the circular ends of the seal support flanges 130 and 156 of the gland 116 and the gland nut 106, by their respective limiting contact with the upper and lower circular shoulders 158 and 160 of the internal seat projection 74, minimizes the structural displacement of the polymer sealing material that can occur even at the highest working pressure to which the valve will be subjected. As shown at the lower portion of FIG. 2, the lower seal assembly is in essence captured and secured against excessive displacement by the surrounding metal structure of the spacer spool, the internal seat projection and the gland nut. The same is true when the piston moves downwardly and shifts the upper seal assembly into sealing engagement with the circular sealing corner 76 of the internal seat projection of the cage member.

Operation

The "normal" condition of the poppet valve of the present invention is as shown in FIGS. 1 and 2, where, in the absence of sufficient pilot pressure above the piston 86 the compression spring 96 will maintain the valve mechanism in its closed position with the lower seal assembly in sealing engagement with the lower circular seat shoulder 78, thus blocking supply pressure of passage 22 from communication with the cylinder or outlet passage 20. At this point the passage 20 will be in communication with the vent passage 18 so that pressure from a pneumatic cylinder or other operated device will flow past the upper circular seat shoulder 76 of the internal seat projection of the valve cage 40 and will be discharged via the vent passage. It should be borne in mind that in the closed position of the valve mechanism the lower support flange 140 of the seal spacer element 138 will be positioned within and in close fitting relation with the internal cylindrical surface 154 of the seat projection 74 so that the circular sealing corner 150 of the polymer or extrusion resistant seal ring will be effectively supported against pressure induced extrusion even when subjected to high working pressure in the range of 10,000 psi or higher. The same mechanically supported seal condition will exist when the upper seal assembly is moved downwardly into sealing engagement with the circular seat shoulder 76.

When opening of the valve is desired, for communication of supply pressure to the cylinder passage 20, pilot pressure is increased in the passage 16, causing pilot pressure to flow through slots 81 of the upper end of the piston and spring section 80 of the cage member 40 and to act on the upper end of the piston 88, thus driving the piston downwardly and moving the upper seal assembly into sealing engagement with the circular seat shoulder 76. This piston and valve seal movement causes isolation of the vent passage 18 from the cylinder passage 20 and communicates the supply passage with the cylinder passage 20 across the opening between the circular seat shoulder and the circular seal corner 150. This open condition of the valve will be maintained until such time as the pilot pressure is sufficiently relieved from the piston so that the force of the compression spring 96 can return the piston and the seal mechanism to the valve closed position described above.

ALTERNATIVE EMBODIMENT

Figure 3:
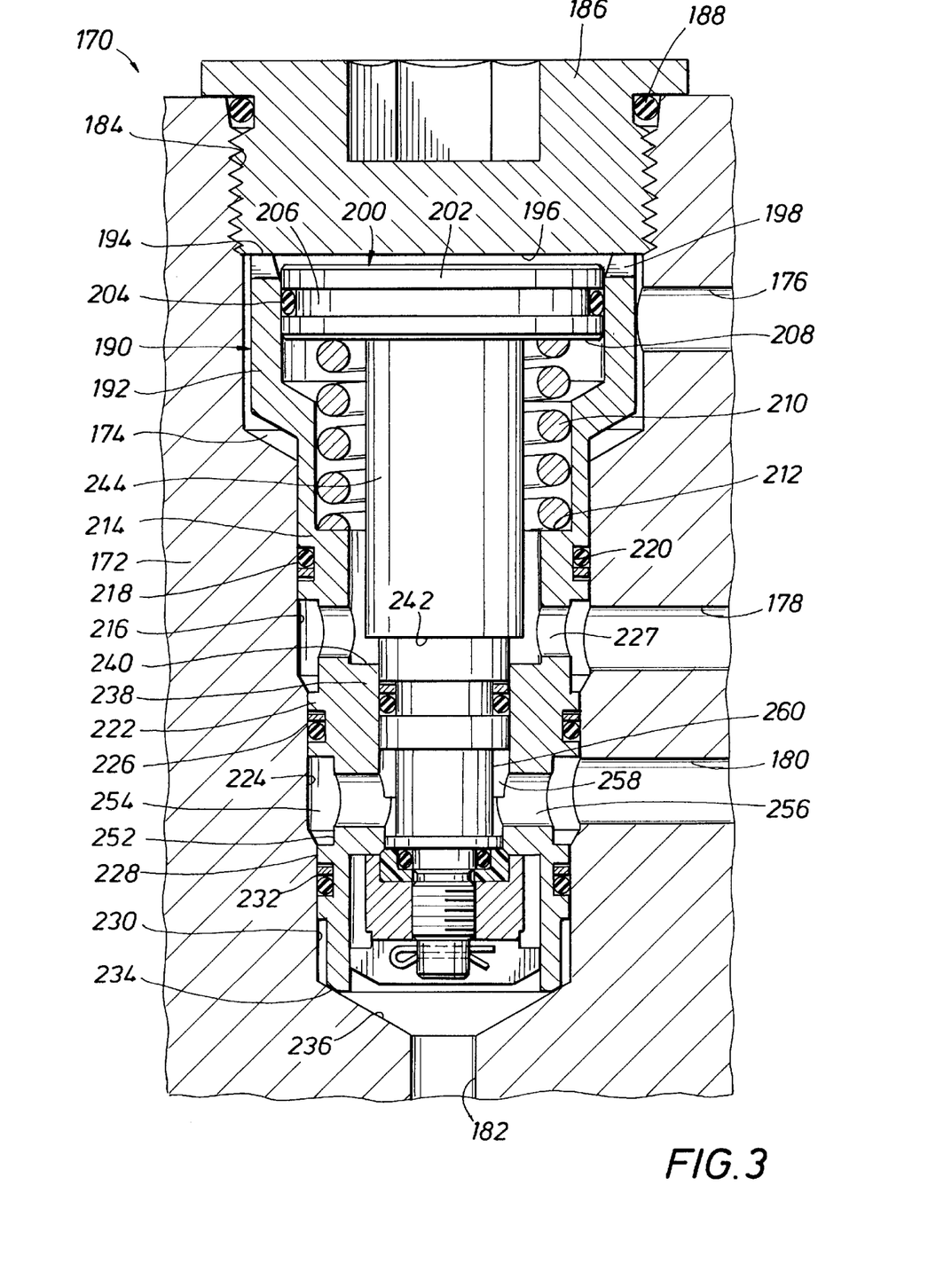
FIG. 3 is a sectional view showing an alternative embodiment of the high pressure poppet valve, with the seal assembly of the valve in its closed position.
Figure 4:
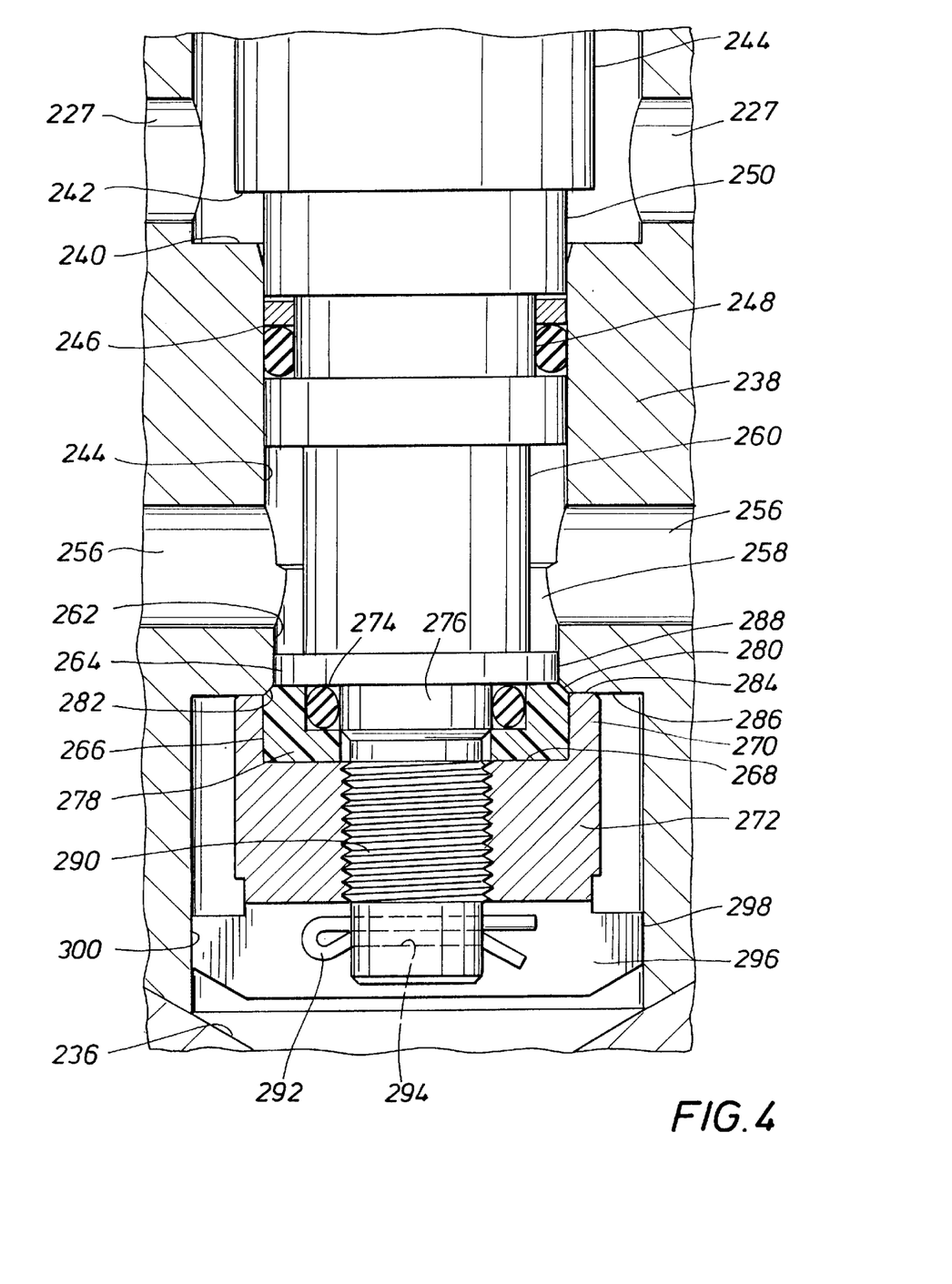
FIG. 4 is an enlarged fragmentary sectional view of the alternative embodiment of FIG. 3, showing the valve mechanism thereof in the closed position blocking supply pressure from the valve outlet passage.

Referring now to FIGS. 3 and 4, an alternative embodiment of the present invention is shown generally at 170 which comprises a pilot valve mechanism having a valve body 172 defining an internal valve chamber 174 and having a pilot pressure passage 176, a vent passage 178, a cylinder or outlet passage 180 and a supply passage 182 extending through the valve body and being in communication with the internal valve chamber. The valve body also defines an internally threaded access opening 184 within which is threadedly received the closure plug 186 being sealed to the valve body by a circular O-ring type sealing member. Typically, the valve body 172 and closure plug 186 will be composed of stainless steel, thereby adapting the valve mechanism for operation in the subsea environment or in other corrosive atmospheres.

Within the valve chamber 174 is provided a valve cage member shown generally at 190 and defining an upper piston and spring section 192 having an upper end 194 which is in restraining engagement with the lower end surface 196 of the closure plug 186. The upper end of the cage member also defines multiple slots 198 through which pilot pressure may be communicated from the pilot passage 176 to the valve chamber region above a piston member shown generally at 200 which is disposed within the piston and spring section of the valve cage. The piston member 200 defines a piston head 202 which is sealed with respect to the piston and spring section of the valve cage by a resilient O-ring type sealing member 204 which is retained within a circular seal groove 206 of the piston head. The piston head also defines a downwardly facing shoulder 208 which is engaged by the upper end of a compression spring 210 which has its lower end seated on an internal shoulder 212 that is defined within the piston and spring section of the cage member. The compression spring functions to urge the piston 200 upwardly to a normally valve closed position in the absence of sufficient pilot pressure to overcome the force of the compression spring.

An intermediate section 214 of the cage member is sealed with respect to an internal cylindrical surface 216 of the valve chamber by means of a seal assembly 218 that is contained within a external seal groove 220 of the valve cage. The seal assembly 218 is defined by elastomeric and polymer seal rings having back-up rings at the respective axial ends of the circular seal groove 220. The seal assembly 218 is located between the pilot and vent passages 176 and 178 to isolate these passages from one another.

Another intermediate cage section 222 is located between the vent and cylinder passages 178 and 180 and is sealed with respect to an internal cylindrical surface 224 of the valve chamber by a seal assembly 226 that is similar to but oppositely arranged as compared to the seal assembly 218. The seal assembly functions to isolate the cylinder and vent passages from one another, externally of the cage member so that the vent passage 178 is provided solely for accommodating the volumetric change within the upper portion of the valve cage as the piston member is moved linearly between its valve opening and closing positions.

The lower end of the valve cage member, below the cylinder passage 180, defines a lower seal section 228 which is sealed with respect to an internal cylindrical surface 230 within the valve chamber by a seal assembly 232 which is of the same type and orientation as compared with the seal assembly 226 but which is of smaller diameter by virtue of its sealing against cylindrical surface 230 and which is of smaller diameter as compared with cylindrical surface 224. The lower end 234 of the cage member is maintained in seated engagement with a tapered internal surface 236 by the lower surface 196 of the closure plug.

The cage member 190, in the region of the cylinder passage 180, defines an internal radially projecting section 238 having an upper circular shoulder 240 that serves as a limit stop for a downwardly facing circular shoulder 242 of the upper section 244 of a piston stem extending downwardly from the piston head 202. The internal projection 238 of the valve cage defines an internal cylindrical sealing surface 244 which is engaged by a circular seal assembly 246 that is contained within a circular seal groove 248 of a reduced diameter section 250 of the piston stem. The seal assembly 246 functions to isolate the cylinder passage 180 from the piston and spring chamber of the valve cage and to limit supply pressure communication from the passage 182 only to the cylinder passage in the open position of the valve mechanism. Between the seal assemblies 226 and 232, the cage member defines a circumferential recess 252 which cooperates with the cylindrical internal surface 224 of the valve body to define a fluid transfer annulus 254 that is communicated via ports 256 with the annular space 258 that is defined between the internal projection 238 of the cage member and a reduced diameter section 260 of the piston stem. At its lower end, the internal projection 238 defines a cylindrical surface section 262 within which received a circular piston stem flange 264 which functions to stabilize the lower end of the piston stem against lateral excursion during its linear opening and closing movement. The circular piston stem flange also functions as a support flange, providing structural support for retention of a circular seal assembly 266 within a circular gland recess 268. The gland recess is defined by an external, axially extending support rim 270 of a castigated gland nut 272 which may be of the same construction and purpose as compared with the gland nut 106 of FIGS. 1 and 2. The seal assembly 266 comprises a elastomer O-ring seal 274 having its inner periphery in sealing contact with a piston stem section 276 and having its upper portion in supported engagement with the piston stem flange 264. The resilient O-ring is seated within a circular recess that is defined within an extrusion resistant seal ring 278 which may be composed of a polymer material such as Delrin, Teflon or any other material that is suitable for the intended purpose. The extrusion resistant sealing element 278 is supported by the circular support flange 264 of the piston stem and by the circular support rim 270 of the gland nut such that only a small circular sealing corner portion 280 thereof is exposed for engagement with a circular seat corner 282 that is defined at the lower portion of the internal projection 238. Further, in the sealing condition of the circular sealing corner with respect to the circular seat corner 282, the upper end 284 of the circular support rim 270 will be in restraining engagement with the downwardly facing circular shoulder 286 of the internal projection. Likewise, the outer peripheral surface 288 of the circular support flange 264 of the piston stem will be in close proximity with the internal cylindrical surface 262 of the internal seat projection. Thus, the exposed circular sealing corner 280 of the extrusion resistant seal ring 278 is protected against the potential for pressure induced extrusion by the interrelated metal structural surfaces of the support flange, the support rim of the gland nut and the internal cylindrical surface 262 of the internal seat projection. Like the gland nut 106 of FIG. 1, the gland nut 272 is received by a lower externally threaded section 290 of the piston stem and is secured against rotation relative to the piston stem by a cotter key 292 that extends through a transverse bore 294 at the lower-most end of the piston stem. Further, the castigated gland nut 272 defines a guide flange 296 having an external guide surface 298 that is disposed in guiding relation with an internal cylindrical surface 300 within the lower end of the valve cage. The guide flange thus minimizes lateral excursion of the lower end of the piston stem as the piston moves the gland nut and seal assembly downwardly from the sealed position shown in FIGS. 3 and 4 to the open position communicating the supply passage with the cylinder passage.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. A high pressure, poppet valve comprising:

(a) a valve body defining a valve chamber and having inlet and outlet passages in communication with said valve chamber;

(b) a valve cage member being located in sealed relation within said valve chamber and defining an internal seat projection having a cylindrical internal surface and defining circular axial seat corners at each axial end thereof;

(c) an elongate seal carrier element being linearly movable within said valve cage and defining therein a pair of circular axially spaced seat surfaces;

(d) means for imparting linear valve operating movement to said elongate seal carrier element;

(e) a pair of seal gland elements being supported in axially spaced relation by said elongate seal carrier element and defining a circular seal recess located about said elongate seal carrier element;

(f) a seal assembly being disposed within each of said circular seal recesses and having a resilient sealing ring in sealing engagement with said seal gland and with said elongate seal carrier element and an extrusion resistant sealing ring defining a circular recess having said resilient sealing ring therein and having radial and axial supporting engagement with said resilient sealing ring, said extrusion resistant sealing ring defining an outer peripheral circular sealing corner oriented for sealing engagement with said circular seat surface;

(g) a spacer spool being disposed about said elongate seal carrier element and having seal support ends defining radially oriented support flanges having a peripheral dimension for close fitting relation within said internal cylindrical surface of said internal seat projection, said radially oriented support flanges cooperating with respective gland elements to expose only said outer peripheral circular sealing corner for sealing engagement with said spaced circular seat shoulders of said internal seat projection; and (h) means securing said seal assembly with said circular seal recess and supporting said extrusion resistant sealing ring against pressure induced extrusion.

2. The high pressure, poppet valve of claim 1, wherein:
(a) said resilient sealing ring being an O-ring composed of elastomeric sealing material; and
(b) said extrusion resistant sealing ring having a generally planar circular portion defining a central aperture through which said elongate seal carrier extends and having a circumferential rim portion being integral with said generally planar circular portion and being located about said O-ring.

3. The high pressure, poppet valve of claim 2, wherein:
said circumferential rim portion of said extrusion resistant sealing ring defining said outer peripheral sealing corner at one axial end thereof.

4. The high pressure, poppet valve of claim 2, wherein:
said circumferential rim portion of said extrusion resistant sealing ring defining oppositely facing axial ends each having an outer peripheral sealing surface and being reversible within said circular seal recess of said seal gland thus permitting selection of one of said outer peripheral sealing surfaces for sealing engagement with said circular seat surface of said valve cage.

5. The high pressure, poppet valve of claim 1, wherein:
(a) said valve cage member defining a pair of spaced generally planar seat surfaces being disposed in intersecting relation with said cylindrical internal surface; and
(b) said circular axial seat corners being located at the intersection of said internal cylindrical seat surface and said pair of spaced generally planar seat surfaces.

6. The high pressure, poppet valve of claim 1, wherein:
(a) said internal seat projection of said valve cage having opposed axial ends and defining a central axially oriented passage through which said elongate seal carrier extends, said central axially oriented passage intersecting each axial end of said generally cylindrical internal seat projection; and
(b) a pair of circular seat surfaces being defined at the intersection of said axial ends and said central axially oriented passage of said generally cylindrical internal seat projection and being positioned for sealing engagement by said outer peripheral circular sealing corner surface of said extrusion resistant sealing ring.

7. The high pressure poppet valve of claim 1, wherein:
(a) said valve cage defining at least one internal guide surface; and
(b) guide means being moved with said elongate carrier element and being disposed for guiding engagement with said internal guide surface and maintaining said elongate carrier element against misalignment during linear movement thereof within valve cage.

8. The high pressure, poppet valve of claim 7, wherein:
one of said seal gland elements defining said guide means.

9. The high pressure, poppet valve of claim 7, wherein:
(a) said elongate carrier element having an externally threaded end;
(b) one of said seal gland elements being a seal gland nut being threadedly received by said externally threaded end; and
(c) said guide means being defined by said seal gland nut.

10. The high pressure, poppet valve of claim 1, wherein:
(a) said elongate seal carrier element being a piston disposed in linearly movable sealed relation within said valve cage member, said piston having an elongate piston stem; and
(b) said seal gland elements being supported in axially spaced relation by said elongate piston stem and being linearly movable therewith.

11. A poppet valve comprising:
(a) a valve body defining a valve chamber and having inlet and outlet passages in communication with said valve chamber, said valve body having internal seat means defining a pair of axially spaced circular seat corners;
(b) seal carrier means being linearly movable within said valve chamber and defining therein a pair of axially spaced circular corner seat surfaces;
(c) means for imparting linear valve operating movement to said seal carrier means;
(d) a pair of seal glands being supported in axially spaced relation by said seal carrier means and defining circular seal recesses, said seal glands having greater axial spacing as compared to axial spacing of said circular axial seat corners and being disposed for sealing engagement with respective circular seat corner surfaces; and
(e) a seal assembly being disposed within each of said circular seal recesses and having an O-ring type resilient sealing element and circular cup-like extrusion resistant sealing element, said extrusion resistant sealing element defining a circular recess having said O-ring type sealing element therein, having a circumferential seal restraint flange providing radial support for said O-ring type resilient sealing element and having a support wall providing axial support for said O-ring type resilient sealing element, said extrusion resistant sealing element defining a circular sealing corner oriented for sealing engagement with one of said circular seat corners; and
(f) spacer means being interposed between said seal assemblies and being in supporting and positioning engagement with said extrusion resistant sealing elements, said spacer means and said seal glands supporting said extrusion resistant sealing element both axially and radially and exposing only said circular sealing corner of said extrusion resistant sealing element for sealing engagement with said circular seat corner surface.

12. The poppet valve of claim 11 wherein:
(a) said valve body defining an axially oriented guide surfaces
(b) one of said seal glands being a gland nut threaded to said seal carrier means, said gland nut defining one of said circular seal recesses; and
(c) guide means being defined by said gland nut and having guiding relation with said axially oriented guide surface for stabilizing said seal carrier means against lateral movement during linear movement thereof.

13. The poppet valve of claim 11, wherein:
(a) said spacer means being a spacer spool being supported by said seal carrier means and having seal support ends defining radially oriented support flanges having a peripheral dimension for close fitting relation within said internal cylindrical surface of said internal seat projection and cooperating with respective glands to expose only said circular sealing corner surface of said extrusion resistant sealing element for sealing engagement with said axially spaced circular seat corner surfaces and to restrain pressure induced extrusion of said extrusion resistant sealing element;

(b) said O-ring type resilient sealing element of each of said seal assemblies being composed of elastomeric sealing material; and (c) said circular cup-like extrusion resistant sealing element having a generally planar circular portion defining a central aperture through which said elongate seal carrier extends and having a circumferential rim portion being integral with said generally planar circular portion and surrounding said resilient sealing element, said extrusion resistant sealing element defining said outer peripheral sealing corner at one axial end thereof.

14. The poppet valve of claim 13, wherein:

said circumferential rim portion of said extrusion resistant sealing ring defining oppositely facing axial ends each defining an outer peripheral sealing corner surface and being reversible within said circular seal recess of said seal gland thus permitting selection of one of said outer peripheral corner sealing surfaces for sealing engagement with said circular seat corner surface.

15. The poppet valve of claim 11, wherein:

(a) said valve body having a generally cylindrical internal seat projection having opposed axial ends and defining a central axially oriented passage through which at least portion of said seal carrier means extends, said central axially oriented passage intersecting each axial end of said generally cylindrical internal seat projection; and (b) a pair of circular seat surfaces being defined at the intersection of said axial ends of said generally cylindrical internal seat projection with said central axially oriented passage and being positioned for sealing engagement by said circular sealing surface of said extrusion resistant sealing ring.

16. The poppet valve of claim 11, wherein:

(a) said generally cylindrical internal seat projection defining circular corner seat surfaces at each axial end of said generally cylindrical internal seat projection;

(b) said seal glands being supported in spaced relation by said spacer means of said seal carrier means; and (c) said seal assemblies being positioned in axially spaced relation by said gland elements for sealing engagement with respective circular seat corner surfaces.

17. The poppet valve of claim 11, wherein:

(a) means within said valve body defining at least one internal guide surface; and (b) guide means being moved with said elongate carrier element and being disposed for guiding engagement within said internal guide surface and maintaining said elongate carrier element against lateral misalignment during linear movement thereof within said valve body.

* * * * *